United States Patent [19]

Pringle

[11] Patent Number: 4,626,148
[45] Date of Patent: Dec. 2, 1986

[54] MOUNT MACHINING ASSEMBLY

[76] Inventor: William L. Pringle, 999 Lakeshore Rd., Grosse Pointe Shores, Mich. 48236

[21] Appl. No.: 493,047

[22] Filed: May 9, 1983

[51] Int. Cl.[4] .............................................. B23D 1/06
[52] U.S. Cl. ..................................... 409/157; 408/50; 408/51; 408/103; 409/162; 409/164
[58] Field of Search ..................................... 408/31–34, 408/62, 70, 103, 42, 43, 45, 52, 108, 109, 110, 111; 409/138, 145, 167, 163, 172, 139, 140, 157, 158, 159, 217, 219, 220, 225, 226, 298

[56] References Cited

U.S. PATENT DOCUMENTS

| | | | |
|---|---|---|---|
| 1,825,721 | 10/1931 | Forward et al. | 409/163 |
| 2,238,011 | 3/1941 | Brouwer | 409/163 X |
| 2,542,986 | 2/1951 | Bowen | 409/163 X |
| 3,456,557 | 7/1969 | Hautau | 408/31 X |
| 3,507,025 | 4/1970 | Ankeney | 408/52 X |
| 3,762,273 | 10/1973 | Sprung | 409/219 X |
| 3,836,276 | 9/1974 | Cloup | 408/16 X |
| 3,977,804 | 8/1976 | Kitagawa | 408/42 X |
| 4,090,803 | 5/1978 | Haley | 408/103 X |
| 4,149,819 | 4/1979 | Kitagawa | 408/70 X |
| 4,198,181 | 4/1980 | Smelser | 408/51 X |
| 4,215,958 | 8/1980 | Jägers | 408/51 X |

Primary Examiner—Gil Weidenfeld
Assistant Examiner—Glenn L. Webb
Attorney, Agent, or Firm—Reising, Ethington, Barnard, Perry & Milton

[57] ABSTRACT

A milling assembly 10 for machining an I-beam 12 including tube flange portions 14, 16 and a web portion 18 therebetween including a pair of oppositely disposed and spaced milling heads 134 for milling the two flanged portions 14, 16 of the I-beam 12 and a support table for supporting the I-beam 12 thereon for reciprocating movement relative to the milling heads 134 to bring the ends of the I-beam 12 in contact with the milling heads 134. Alignment buttons 49, 76, 108, 124 are mounted on the support table for aligning the I-beam 12 upon the support table 128 in a predetermined position and three clamping stations 24, 26 and 28 are mounted on the support table 128 for fixedly clamping the I-beam 12 along the length of the support table 128.

19 Claims, 6 Drawing Figures

MOUNT MACHINING ASSEMBLY

TECHNICAL FIELD

The instant invention relates to a milling assembly for machining the ends of the flanges of an I-beam. More specifically, the instant invention relates to an assembly for aligning and clamping an I-beam thereto and reciprocating the I-beam relative to a pair of milling heads to mill each of the ends of the flanges of the I-beam about the intermediate web of the I-beam.

BACKGROUND ART

Various frame structures comprise a plurality of vertically rising beams interconnected by laterally disposed cross beams. One method of interconnecting the cross beams and the vertical beams utilizes I-beams including a pair of flanged portions and a web portion therebetween; the web portion being disposed midway between the ends of the flanged portions. The I-beam is machined to grind away the end portions of the flanged portions without grinding the web portion. Once machined, the ends of web portion extend beyond the flanged portions of the I-beam. These end portions of the web portion can be inserted into openings in or otherwise supported by vertical I-beams and fixedly secured thereto, as by welding.

The instant invention provides means for locating the I-beam to be milled in a predetermined position relative to the milling heads of the assembly, fixedly clamping the I-beams to the assembly, and then moving the I-beam against the milling heads to perform the desired milling operation.

STATEMENT OF THE INVENTION

In accordance with the present invention, there is provided a milling assembly for machining an I-beam including two flanged portions and a web portion therebetween, the assembly including milling means for end-on milling of the two flanges of the I-beam and support means for supporting the I-beam thereon and for reciprocating movement relative to the milling means to bring the ends of the I-beam in contact with the milling means. The assembly further includes alignment means for aligning the I-beam upon the support means in a predetermined position and clamping means including a plurality of clamping stations for fixedly clamping the I-beam along the length thereof upon the support means.

FIGURES IN THE DRAWINGS

An embodiment of a milling assembly constructed in accordance with the present invention will now be described, by way of example only, with reference to the accompanying drawings in which.

DETAILED DESCRIPTION OF THE DRAWINGS

Referring to the FIGURES, a milling assembly constructed in accordance with the instant invention is generally shown at 10.

An I-beam generally indicated at 12 and shown in phantom in the drawings. The I-beam consists of two flanged portions 14 and 16 and a web portion 18 therebetween. The web portion 18 interconnects the flanged portions 14 and 16 and is disposed between the ends of each of the flanged portions 14 and 16.

The assembly 10 includes milling means generally indicated at 20 for end-on milling of the two flanged portions 14 and 16 of the I-beam 12, support means generally indicated at 22 for supporting the I-beam 12 thereon for reciprocating movement relative to the milling means 20 to bring the ends of the I-beam 12 in contact with the milling means 20, alignment means for aligning the I-beam 12 upon the support means 22 in a predetermined position, and clamping means including a plurality of clamping stations for fixedly clamping the I-beam 12 along the length of the support means 22.

More specifically, the clamping means includes a first clamping station generally indicated at 24 for engaging the edges of the flanged portions 14 and 16 of the I-beam 12 from a vertical direction. A second clamping station, generally indicated at 26, engages the flanged portions 14, 16 of the I-beam 12 in the horizontal direction. A third clamping station, generally indicated at 28, engages the web portion 18 of the I-beam 12 in the vertical direction. The first clamping station 24 is supported on the support means 22 proximate to the milling means 20. The third clamping station 28 is supported on the opposite end of the support means 22. The second clamping station 26 is disposed therebetween.

The first clamping station 24 includes a hydraulically actuated clamping member comprising a vertically reciprocating first rod 30 and a platen 32 mounted thereon. A rod end member 34 is threaded upon the rod 30, the rod end member 34 including a downwardly projecting portion 36 having an opening 38 therethrough. A pin 40 interconnects the platen 32 to the rod end member 34 for pivotal movement relative thereto. By pivoting, the platen 32 can fixedly clamp down on the flanged portions 14 and 16 of the I-beam 12 and be adapted to I-beams having different sized flanged portions 14 and 16. In other words, various I-beams may have different sized flanged portions 14 and 16 adapted for the further requirements of the I-beam 12. The platen 32 pivots relative to the hydraulically actuated rod member 30 so as to be able to engage both flanges 14 and 16 of the I-beam 12 whether or not the flanges 14 and 16 are identically sized.

The first clamping station 24 includes stop means for engaging the I-beam between the stop means and the clamping means. The stop means includes a first base comprising a base pad 42 made from hardened steel and a base pad support 44 mounted on the support means 22. The base pad 42 includes two spaced raised portions 46 for supporting the edges of the flanges 14, 16 of the I-beam 12 thereon. The raised portions 46 of the base pad 42 provide raised platforms upon which the flanged portions 14 and 16 of the I-beam 12 are supported. The alignment means of the assembly includes a rest button 49 to ensure horizontal alignment of the I-beam 12 within the first clamping station 24.

The first clamping station 24 includes guide means for guiding the pivoting movement of the platen 32 along a unitary plane. The plane is perpendicular to the line defined by the length of the I-beam 12 to ensure alignment of the pivoting movement of the platen 32 so that the bottom surface of the platen 32 contacts the entire edge of the I-beam disposed below the platen 32. There is complete contact between the edges of the flanged portions 14 and 16 and the bottom surface of the platen 32 as the guide means guides the pivoting movement of the platen 32 in a plane perpendicular to the line defined by the length of the I-beam 12. Thusly, the platen 32 provides a secure clamping grip upon the I-beam 12 and against the base pad 42. More specifically, the assembly 10 includes a frame supported by the support means 22 at the first clamping station 24, the frame including a pair of spaced upwardly extending legs 48 and 50 and a cross member 52 supported therebetween. The frame is secured to the support means 22 by fasteners 51. The rest button 49 is supported on the leg 48. The cross member 52 includes a hole extending therethrough. The guide means includes a guide rod 54 having a first portion connected to the platen 32 for pivotal movement relative thereto and a second portion 56 projecting through the hole in the cross member 52 for guided movement therethrough. The guide rod 54 restricts rotation of the platen 32 while allowing for reciprocating and pivoting movement of the platen 32. A hydraulic cylinder 58 is also supported upon the cross member 52 and connected thereto by fasteners 60. The first rod 30 is actuated for reciprocating movement by the hydraulic cylinder 58 and extends through a second opening in the cross member 52.

In operation, as the first rod 30 is actuated for downward movement by the cylinder 58, the platen 32 engages the flanged portions 14 and 16 of the I-beam 12. The guide rod 54 slides through the hole in the cross member 52 in a vertical direction so as to maintain the table movement of the platen 32 in a single plane which is perpendicular relative to the line defined by the length of the I-beam 12.

The second clamping station 26 includes a second hydraulically actuated reciprocating rod 62 actuated to move by a second hydraylic cylinder 64. Other types of actuating cylinders could be used, such as an air-actuated cylinder. The cylinder 64 is secured by screws 66 to a mounting platform 68 which is, in turn, secured by screws 70 to the support means 22. A first mount member 72 is fixedly secured to the support means 22 by screws 74. The second clamping station 26 includes stop means comprising a button member 76 mounted on the first mount member 72 and extending towards the second rod 62 for clamping the outside faces of the flanged portions 14, 16 of the I-beam 12 therebetween. A clamping button 78 made of hardened steel is mounted on the end of the second rod 62 for engaging the flanged portion 14 of the I-beam 12.

The first mount member 72 includes a base portion 80 having a bore 82 extending therethrough. The support means 22 includes a guide dowel 84 extending upwardly therefrom from mating engagement with the bore 82 to align the first mount member 72 thereon. Thusly, the clamping button 76 mounted on the first mount member 72 provides an alignment means for aligning the I-beam 12 in the horizontal direction as the second rod member 62 is factuated to clamp the I-beam against the clamping button 76.

Figure 1:
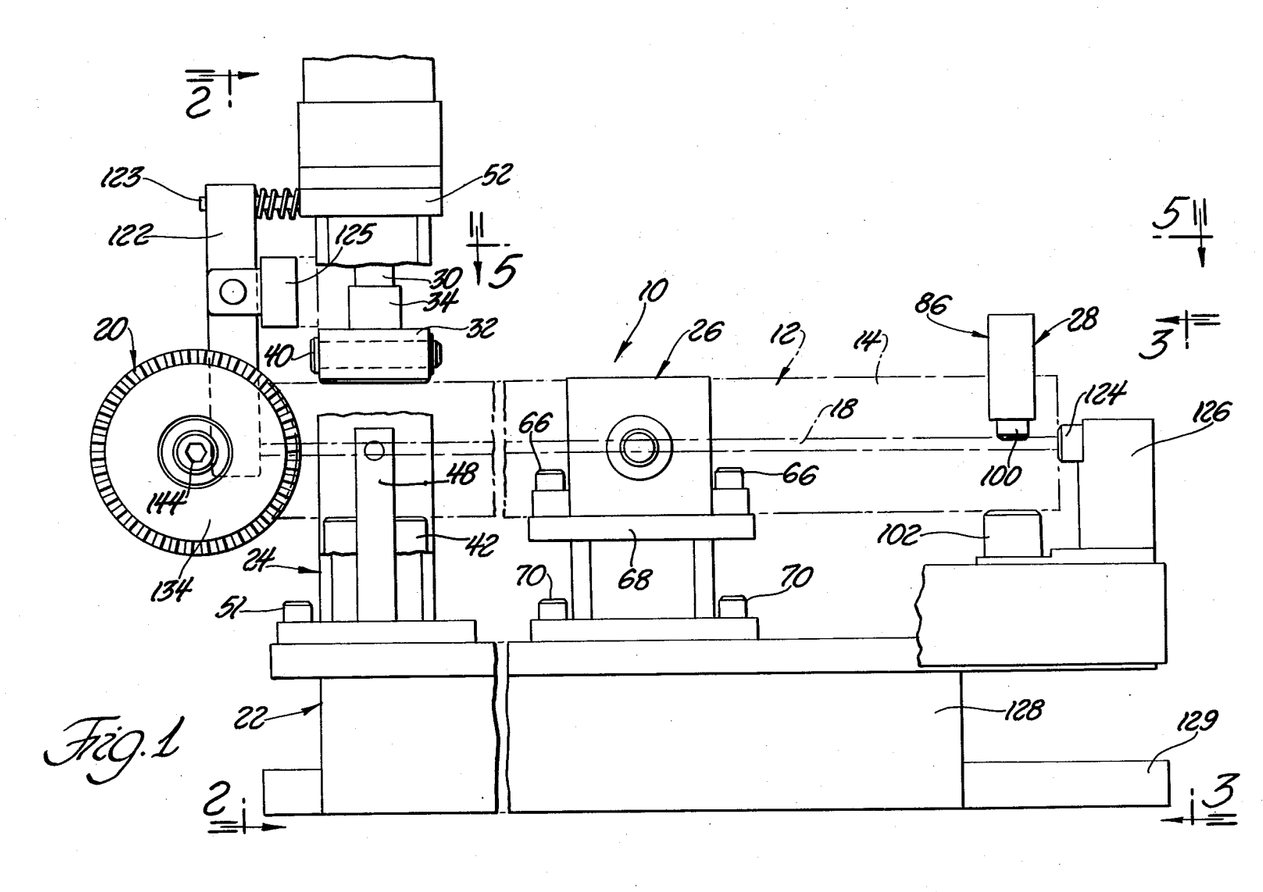
FIG. 1 is an elevational view partially broken away and in cross section of an I-beam clamped upon the instant invention.
Figure 2:
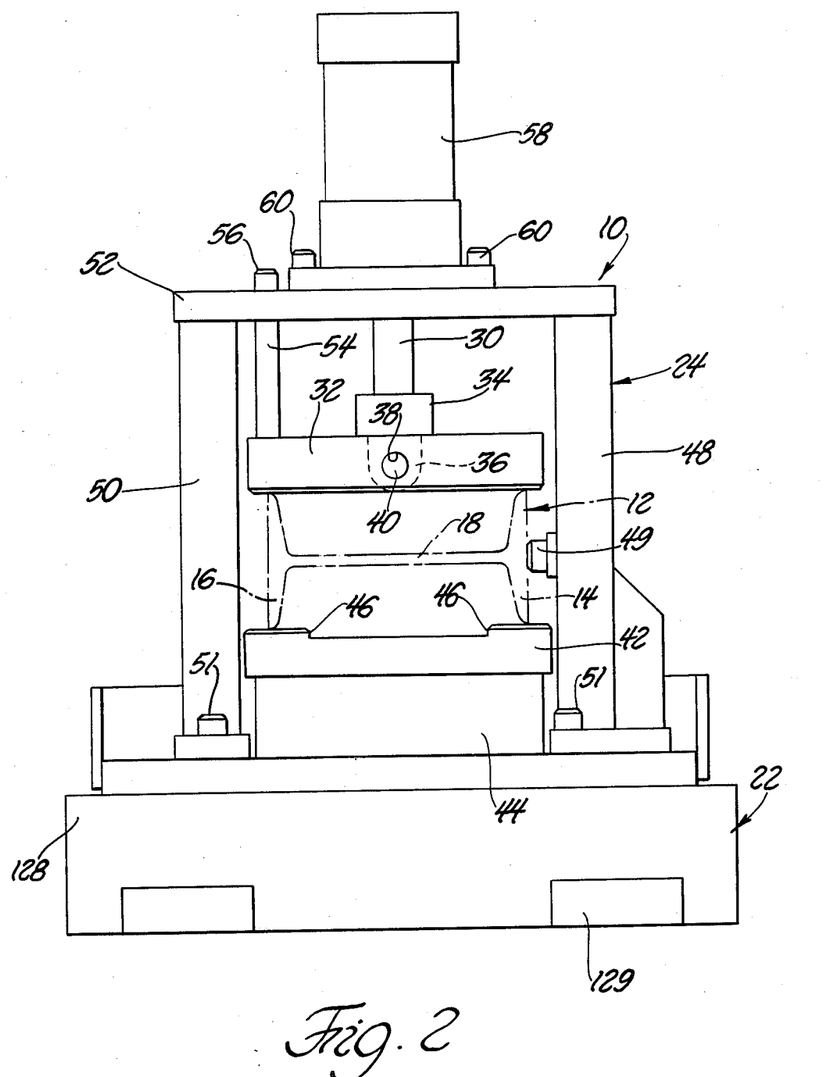
FIG. 2 is a view taken substantially along lines 2—2 of FIG. 1.
Figure 3:
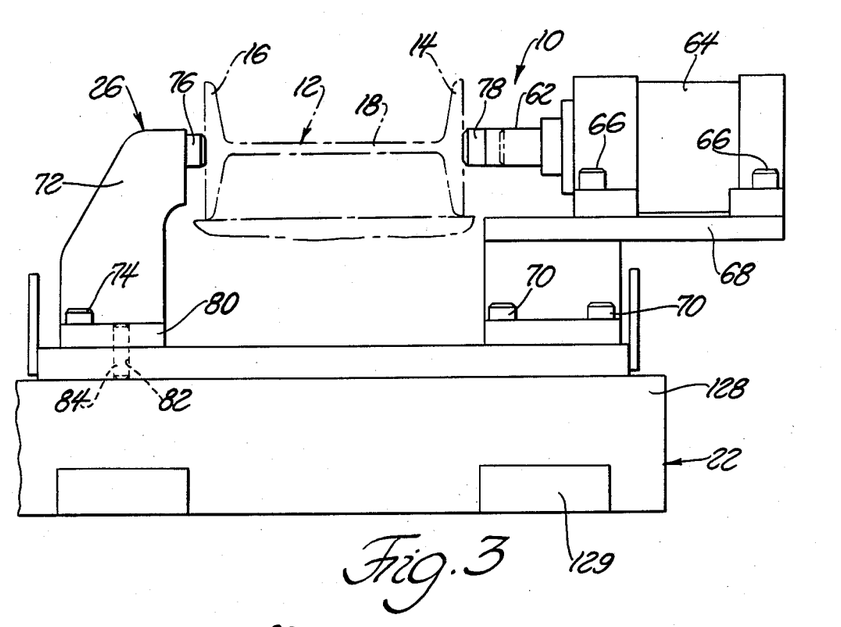
FIG. 3 is a fragmentary view taken substantially along lines 3—3 of FIG. 1.
Figure 4:
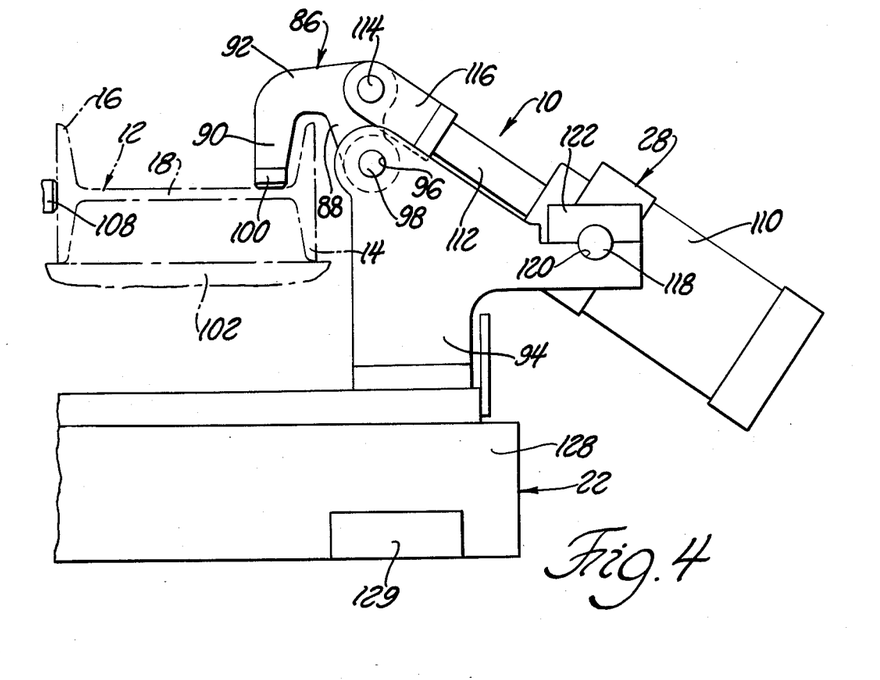
FIG. 4 is a fragmentary view taken substantially along lines 4—4 of FIG. 5.
Figure 5:
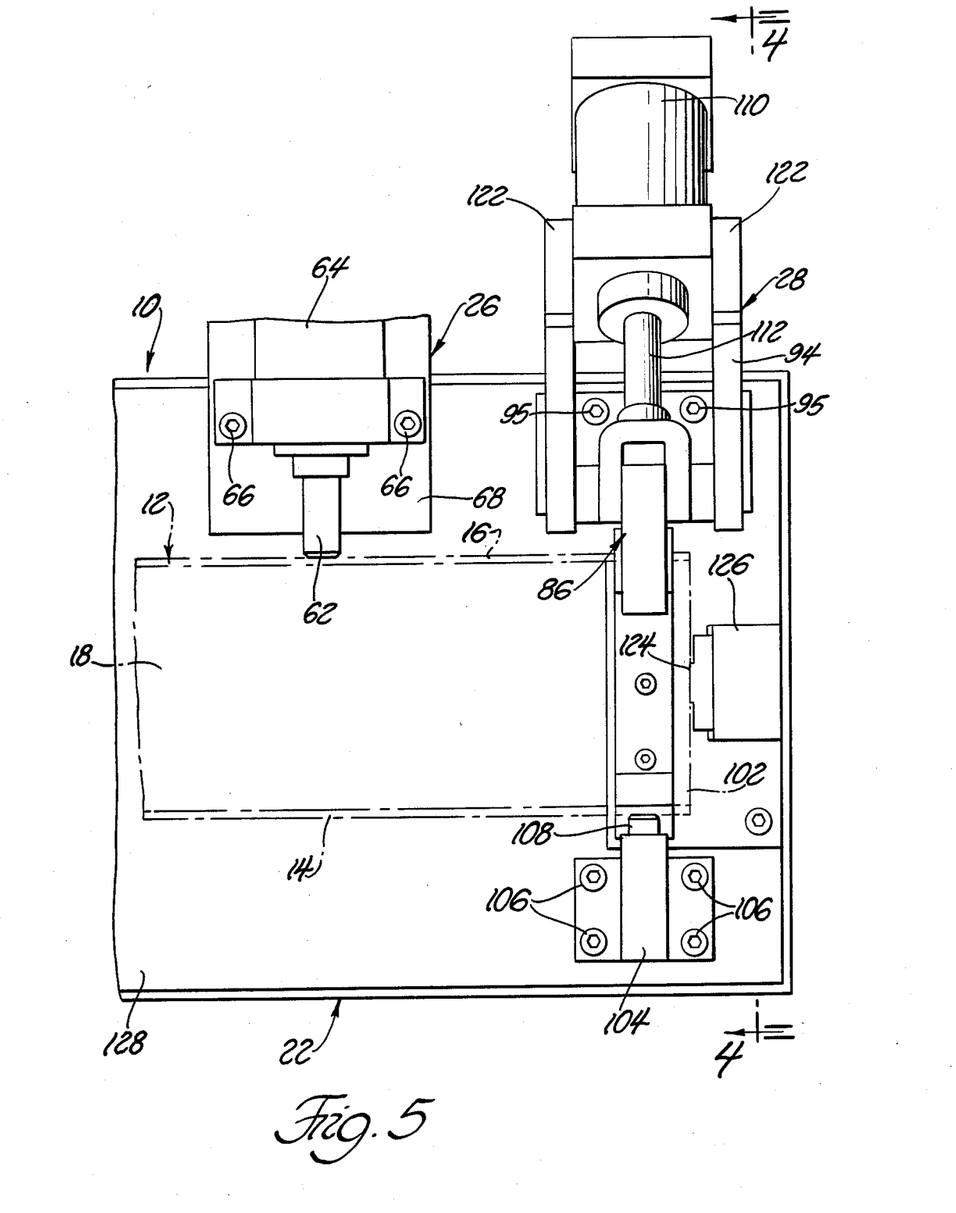
FIG. 5 is a fragmentary plan view taken substantially along lines 5—5 of FIG. 1.

The third clamping station 28 includes a substantially U-shaped clamp member, generally indicated at 86, having a first and second leg 88 and 90, respectively, and an intermediate portion 92 therebetween. The support means 22 includes a second mount member 94 secured to the support means by fasteners 95 and including fan opening 96 extending therethrough. The first leg 88 of the U-shaped clamp 86 has an opening therethrough. A pin member 98 extends through the opening 96 in the second mount member 94 and the opening in the first leg 98 of the U-shaped clamp 86 for pivotally mounting the U-shaped clamp 86 upon and relative to the second mount member 94. A clamp button 100 is mounted on the end of the second leg 90 of the U-shaped clamp 86. A second base member 102 is mounted upon the support means 22 and provides stop means for supporting the flanged portions 14 and 16 of the I-beam 12 as the second leg 90 of the U-shaped clamp 86 engages the opposite side of the web portion 18 of the I-beam 22, as shown in FIG. 4. The alignment means includes a third mount 104 secured to the support means 22 by bolts 106. A clamp button 108 is mounted on the third mount 104 for engaging the side face of the flanged portion 14 of the I-beam 12 for alignment of the end portion of the I-beam 12 in the horizontal direction.

The third clamping station 28 further includes a third cylinder 110 which may be either actuated by hydraulic fluid or air, mounted on the second mounting member 94 for pivotal movement relative thereto. A third reciprocating rod 112 extends from the third cylinder 110 and is connected to the U-shaped clamp 86 by a pin 114 for actuating the pivoting movement of the U-shaped clamp 86. More specifically, a rod clevice 116 includes a threaded bore which mates with the threaded end portion of the rod 112. The clevice 116 has an opening at the end thereof for receiving the pin 114 thereby operatively connecting the rod member 112 to the U-shaped clamp 86. As the rod member 112 reciprocates in response to actuation by the cylinder 110, the U-shaped clamp 86 pivots about an axis defined by the pin member 98.

The third cylinder 110 includes a pair of trunions 118 extending therefrom. The second mount member 94 includes a cradle portion 120 supporting the trunions 118 for allowing pivoting movement of the third cylinder 110 therebetween. A pair of trunion clamps 122 retain the trunions 118 on the cradle 120.

Thus, the instant invention provides three clamping stations for fixedly clamping the I-beam 12 along the length thereof upon the support means 22. Each of the clamping stations 24, 26 and 28 include a hydraulically actuated clamping rod and stop means for engaging the I-beam 12 therebetween.

The alignment means includes a spring biased clamp 127 disposed on the support means 22 proximate to the milling means 20 and a stop member 124 mounted on a third mount member 126 at the opposite end of the support means 22 for engaging the ends of the web portion 18 of the I-beam 22 therebetween. The clamp 127 is connected to the cross member 52 by a fastener 123. A stop 125 is mounted on the clamp 127 for pivotal movement relative thereto. The stop 125 is biased by spring 121 to engage the exposed end of the pin 40 when the platen 32 is raised. Upon insertion of an I-beam 12 onto the assembly 10, the clamp 127 is moved so as to disengage the stop 125 from the platen 32. The clamp 127 and stop member 124 provide means for initially aligning the I-beam 12. The clamp 127 is disposed between the milling means 20 to maintain the engagement of the web portion 18 during the milling of the flanges 14 and 16.

The alignment means further includes the laterally extending stop members 48 and 76 supported on the support means 22 at the first and second clamping stations 24 and 26 respectively, for engaging one of the flanged portions 14 and 16 to laterally align the I-beam 12 on the support means 22.

Figure 6:
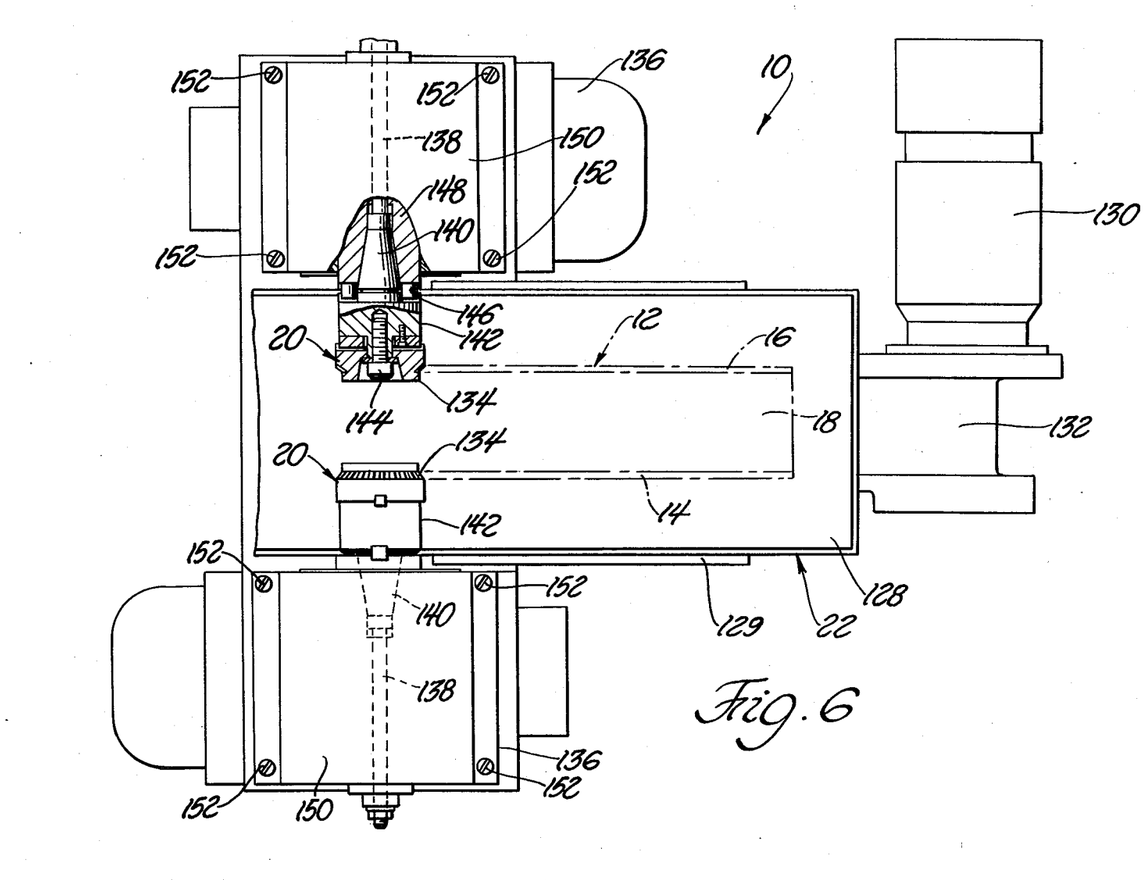
FIG. 6 is a top plan view of the instant invention having the clamping means removed.

The support means 22 comprises a table 128 disposed on a main frame 129 for reciprocating movement thereover. As shown in FIG. 6, an actuating mechanism including a motor 130 and drive mechanism 132 actuates the reciprocating axial movement of the table 128 over the main frame 129. A reversible screw drive may be driven by the motor 130 for actuating the movement of the table 128.

The milling means 20 includes a pair of laterally spaced and opposed milling heads 134 for milling a semicircular cut into the ends of the flanged portions 14 and 16 of the I-beam 12. The milling means 20 further includes a pair of laterally opposed motors 136, the milling heads 134 being supported by and driven by each of the motors 136. The motors 136 are supported above the table 128 by the main frame 129. More specifically, each motor 136 drives a drive rod 138 as shown in FIG. 6. The drive rod 138 is operatively connected to the milling heads 14 by a spindle 140 and an adapter 142. A bolt 144 secures the milling head 134 upon the adapter 142. Bearings 146 are disposed between the adapter 142 and the housing 148 supporting the spindle 14. Each motor 136 has a cover 150 secured about the motor 136 by screws 152.

The sequence of operation of the assembly 10 includes a first step whereinn the I-beam 12 is loaded on the assembly 10 between the alignment means comprising the spring clamp 127 and the stop member 124 thereby aligning the I-beam on the table 128. Secondly, the second clamping station 26 is actuated to clamp the I-beam 12 in the horizontal direction between the rod 62 and clamp button 76. Thirdly, the first clamping station 24 is actuated so that the I-beam 12 is clamped between the platen 32 and base pad 42. Finally, the third clamping station 28 is actuated so as to clamp the leg 90 of the U-shaped clamp 86 against the web 18 of the I-beam 12. The sequence of clamping operations can be controlled by control valves at a single control station by a single operator. The table 128 is actuated by the motor 130 to move along the main frame 129 to bring the ends of the flanges 14 and 16 of the I-beam 12 in milling contact with the milling heads 134. The table 128 is actuated to move the I-beam away from the milling heads 134, the I-beam 12 is then unclamped, and repositioned so as to grind the other end thereof.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A milling assembly (10) for machining an I-beam (12) including two flanged portions (14,16) and a web portion (18) therebetween, said assembly (10) comprising; milling means (20) for end milling of the two flanged portions (14,16) of the I-beam (12), said milling means (20) including a pair of laterally opposed motors (136) and a rotary milling head (134) supported and driven by each of said motors (136); support means (22) for supporting the I-beam (12) thereon and for reciprocating movement relative to said milling means (20) to bring the ends of the I-beam (12) in contact with said milling means (20), said motors being disposed above said support means (22); alignment means for aligning the I-beam (12) upon said support means (22) in a predetermined position; and clamping means including a plurality of clamping stations (24,26,28) for fixedly clamping the I-beam along the length upon said support means (12), each of said clamping stations (24,26,28) including a hydraulically actuated clamping member and stop means for engaging the I-beam (12) therebetween, said clamping means including a first clamping station (24) for engaging the edges of the flanged portions (14,16) from a vertical direction and a second clamping station (26) for engaging the flanged portions (14,16) of the I-beam (12) in the horizontal direction and a third clamping station (28) for engaging the web (18) of the I-beam (12) in the vertical direction, said first clamping station (24) being supported on said support means (22) proximate to said milling means (20) and said third clamping station (28) being supported on the opposite end of said support means (22), said second clamping station (26) being disposed therebetween, said alignment means including a spring biased clamp (127) supported by said first clamping station and disposed on said support means (22) and extending downwardly between said milling heads (134) proximate to said milling means (20) and a stop member (124) and a third mount member (126), said stop member (124) being mounted on said third mount member (126) at the opposite end of said support means (22) for engaging the end of the web portion (18) of the I-beam (12) between the two flanged portions (14,16).

2. An assembly as set forth in claim 1 wherein said hydraulically actuated clamping member of said first station (24) includes a vertically reciprocating first rod (30) and a platen (32) mounted thereon and said stop means includes a first base (42) supported on said support means (22) for clamping the edges of the flanges (14, 16) of the I-beam (12) therebetween.

3. An assembly as set forth in claim 2 wherein said first rod (30) of said first clamping station (24) has an end portion, said assembly (10) including connector means (34) for connecting said platen (32) to said end portion of said rod (30) for pivoting movement of said platen (32) relative to said rod (30).

4. An assembly as set forth in claim 3 including guide means for guiding the pivoting movement of said platen (32) along a unitary plane.

5. An assembly as set forth in claim 4 including a frame supported on said support means (22) at said first station (24) and including a pair of spaced upwardly extending legs (48, 50) and a cross member (52) supported therebetween, said cross member (52) including a hole extending therethrough, said guide means including a guide rod (54) having a first portion connected to said platen (32) for pivoting movement relative thereto and a second portion (56) projecting through said hole in said cross member (52) for guided movement therethrough.

6. An assembly as set forth in claim 5 wherein said first clamping station (24) includes a first cylinder (58), said first rod (30) extending from said cylinder (58), said cross member (52) including an opening therethrough and fastening means (60) for fastening said first cylinder (58) to said cross beam (52), said first rod (30) projecting through said opening.

7. An assembly as set forth in claim 6 wherein said first base includes a base pad (42) made from hardened steel and a base pad support (44) for supporting said base pad (42) upon said support means (22).

8. An assembly as set forth in claim 7 wherein said base pad (42) includes two spaced raised portions (46) for supporting the edges of the flanges (14, 16) of the I-beam (12) thereon.

9. An assembly as set forth in claim 1 wherein said second clamping station (26) includes a second hydraulically actuated reciprocating rod (62) and a first mount member (72) fixedly secured to said support means (22), said stop means including a button member (76) mounted on said first mount member (72) extending towards said second rod (62) for clamping the flanged portions (14, 16) of the I-beam (12) therebetween.

10. An assembly as set forth in claim 9 including a clamping button (78) made of hardened steel mounted on said second rod for engaging the flanged portion (14) to I-beam (12).

11. An assembly as set forth in claim 10 wherein said first mount member (72) includes a base portion (80) having a bore (82) extending into said base portion (80), said support means (22) including a guide dowel (84) extending upwardly therefrom for mating engagement with said bore (82) to align said first mount members (72).

12. An assembly as set forth in claim 1 wherein said third clamping station (28) includes a substantially U-shaped clamp (86) having a first and second leg (88, 90) and an intermediate portion (92) therebetween, said first leg (88) being mounted on said support means (22) for pivoting movement of said U-shaped clamp (86), said stop means including a second base (102) for supporting the flanged portions (14, 16) of the I-beam (12) as said second leg (90) of said U-shaped clamp (86) engages the opposite side of the web (18) of the I-beam (22).

13. An assembly as set forth in claim 12 including a third cylinder (110) mounted on said support means (22) for pivoting movement relative thereto and a third reciprocating rod member (112) extending from said third cylinder (110) and being connected to said U-shaped clamp (86) for actuating the pivoting movement of said U-shaped clamp (86).

14. An assembly as set forth in claim 13 wherein said third clamping station (28) includes a second mount (94) supported by said support means (22), said third cylinder (110) including a pair of trunions (118) extending therefrom, said second mount (94) including a cradle portion (120) supporting said trunions (118) for pivoting movement of said third cylinder (110) therebetween and a pair of trunion clamps (122) for retaining said trunions (118) on said cradle (120).

15. An assembly as set forth in claim 1 wherein said alignment means includes a laterally extending stop member (49) supported on said support means (22) at said first clamping station (24) for engaging one of the flanged portions (14, 16) of the I-beam (12) to laterally align the I-beam (12) on said support means (22).

16. An assembly as set forth in claim 1 wherein said milling means (20) includes a pair of laterally spaced and opposed milling heads (134) for milling a semicircular cut into the ends of the flanged portions (14, 16) of the I-beam (12).

17. An assembly as set forth in claim 16 including a main frame (129), said support means (22) being disposed on said main frame (129) for reciprocating movement thereover, said milling means (20) being fixedly supported on said main frame (129).

18. An assembly as set forth in claim 17 wherein said milling means (20) includes a pair of laterally opposed motors (136) and a milling head (134) supported and driven by each of said motors (136), said motors (136) being supported above said support means (22) by said main frame (129).

19. A milling assembly (10) for machining an I-beam (12) including two flanged portions (14,16) and a web portion (18) therebetween, said assembly (10) comprising: a main support frame (129); a pair of laterally opposed motors (136) and a rotary milling head (134) supported by and driven by each of said motors (136), said motors (136) being fixedly supported by said main support frame (129); a support table (128) for supporting the I-beam (12) thereon, said support table (128) being mounted on said main support frame (129) for reciprocating movement relative to said milling heads (134) to bring the ends of the I-beam (12) in contact with the milling heads (134); a first clamping station (24) supported on said support table (128) proximate to said milling heads (134) for engaging the edges of the flanges (12,14) of the I-beam (12) from a vertical direction, said first clamping station (24) including a hydraulically actuated reciprocating first rod (30) and a platen (32) mounted on said first rod member (30) for pivoting movement relative thereto and a guide rod (54) operatively connected to said platen (32) for guiding the pivoting movement of said platen (32) and a first base (42) including two spaced raised portions (46) for supporting the edges of the flanged portions (14,16) of the I-beam (12); a second clamping station (26) disposed above an intermediate portion of the support table (128) for engaging the flanged portions (14,16) of the beam (12) in a horizontal direction and including a second hydraulically actuated reciprocating rod (62) and a first mount (72) and a button (76) supported on said first mount (72) and being laterally opposed to said second rod (62) for clamping the I-beam (12) therebetween; a third clamping station (28) at a distal end of said support table (128) for engaging the web portion (18) of the I-beam (12) in the vertical direction, said third clamping station (28) including a second mount (94) supported by said support table (128) and a third cylinder (110) including a pair of trunions (118) extending therefrom supported on said second mount (94) for pivoting movement relative thereto and a third reciprocating rod (112) extending from and actuated by said third cylinder (110) and a U-shaped clamp (86) pivotally connected to said second mount (94) and a connector (116) secured to said third rod (112) and pivotally connected to said U-shaped clamp (86) and a second base (102) for supporting the flanged portions (14,16) of the I-beam (12) as said U-shaped clamp (86) engages the opposite side of the web (18) of the I-beam (12); and a spring biased clamp (127) disposed over said support table (128) and extending downwardly between and supported by said first clamping station and proximate to said milling heads (134), said assembly (10) further including a stop member (124) and a third mount member (126), said stop member (124) being mounted on said third mount member (126) at the opposite end of said support table (128) for engaging the ends of the web-portion (18) of the I-beam (12) between the two flanged portions (14,16).

* * * * *